United States Patent
Oyama

(10) Patent No.: US 10,604,139 B2
(45) Date of Patent: Mar. 31, 2020

(54) DRIVE ASSIST APPARATUS FOR VEHICLE

(71) Applicant: SUBARU CORPORATION, Tokyo (JP)

(72) Inventor: Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 3 days.

(21) Appl. No.: 16/000,806

(22) Filed: Jun. 5, 2018

(65) Prior Publication Data

US 2019/0039593 A1 Feb. 7, 2019

(30) Foreign Application Priority Data

Aug. 3, 2017 (JP) ................................. 2017-150862

(51) Int. Cl.
  *B60W 10/20* (2006.01)
  *G08G 1/16* (2006.01)
  *B60W 50/08* (2020.01)

(52) U.S. Cl.
  CPC ............ *B60W 10/20* (2013.01); *B60W 50/08* (2013.01); *G08G 1/166* (2013.01)

(58) Field of Classification Search
  CPC ......... B60W 10/20; B60W 50/08; G08G 1/16
  See application file for complete search history.

(56) References Cited

U.S. PATENT DOCUMENTS 7,711,464 B2 * 5/2010 Kaufmann ........... B62D 15/029
  701/41

7,890,231 B2 * 2/2011 Saito ........................ B62D 1/28
  701/301

(Continued)

FOREIGN PATENT DOCUMENTS

CN 106476803 A 3/2017
JP 11-126300 A 5/1999

(Continued)

OTHER PUBLICATIONS

Japanese Notice of Reasons for Refusal issued in corresponding Japanese Patent Application No. 2017-150862, dated May 14, 2019, with English Translation.

*Primary Examiner* — Kira Nguyen
(74) *Attorney, Agent, or Firm* — McDermott Will & Emery LLP

(57) ABSTRACT

A drive assist apparatus, for vehicle, includes a position detector, a storage, a display, an operation unit, and a controller. The position detector acquires own vehicle position information on the basis of a position signal received from positioning satellites. The storage stores road map information. The display displays a symbol representing the own vehicle at a position indicated by the own vehicle position information acquired by the position detector, and displays the road map information around the own vehicle information acquired by the position detector. The operation unit receives a relative moving operation. The relative moving operation allows the symbol representing the own vehicle and the road map information both displayed on the display to move relative to each other in a vehicle width direction. The controller corrects the own vehicle position information in accordance with the relative moving operation received by the operation unit.

18 Claims, 9 Drawing Sheets

(56) References Cited

U.S. PATENT DOCUMENTS

| | | | | |
|---|---|---|---|---|
| 8,818,606 B2* | 8/2014 | Lee | ............... | B60W 10/20 701/23 |
| 8,838,337 B2* | 9/2014 | Ueda | ............... | G05D 1/0088 340/435 |
| 8,954,217 B1* | 2/2015 | Montemerlo | ......... | B60W 30/00 701/26 |
| 10,000,236 B2* | 6/2018 | Otake | ............... | B62D 15/025 |
| 2007/0139176 A1 | 6/2007 | Victor et al. | | |
| 2008/0079753 A1 | 4/2008 | Victor et al. | | |
| 2012/0123613 A1 | 5/2012 | Waki et al. | | |
| 2016/0107687 A1* | 4/2016 | Yamaoka | ............ | B62D 15/0255 701/41 |
| 2017/0021765 A1* | 1/2017 | Mori | ............... | B60Q 9/00 |
| 2017/0057503 A1 | 3/2017 | Cho | | |
| 2017/0343374 A1* | 11/2017 | Yi | ............... | G01C 21/3632 |
| 2018/0141588 A1 | 5/2018 | Shimizu | | |

FOREIGN PATENT DOCUMENTS

| | | |
|---|---|---|
| JP | 2002-148064 A | 5/2002 |
| JP | 2003-044137 A | 2/2003 |
| JP | 2007-512636 A | 5/2007 |
| JP | 2008-032500 A | 2/2008 |
| JP | 2017-013586 A | 1/2017 |
| WO | 2011/007484 A1 | 1/2011 |
| WO | 2017/022474 A1 | 2/2017 |

* cited by examiner (b)

DRIVE ASSIST APPARATUS FOR VEHICLE

CROSS-REFERENCE TO RELATED APPLICATIONS

The present application claims priority from Japanese Patent Application No. 2017-150862 filed on Aug. 3, 2017, the entire contents of which are hereby incorporated by reference.

BACKGROUND

The technology relates to a drive assist apparatus, for vehicle, that assists driving of an own vehicle traveling along a lane.

A vehicle navigation system mounted on an own vehicle acquires information regarding a position of the own vehicle or information regarding a traveling azimuth on the basis of position information received from positioning satellites, and matches the acquired pieces of information with road map information to acquire position information of the middle of a lane immediately ahead of the own vehicle in a traveling direction and information regarding a road azimuth of the road immediately ahead of the own vehicle. The positioning satellites may be, for example, satellites of a global navigation satellite system (GNSS) such as satellites of a global positioning system (GPS). Further, radio navigation has been known that performs a steering control in automatic driving to cause the own vehicle to travel in the middle of the lane. For example, reference can be made to Japanese Unexamined Patent Application Publication No. 2017-13586.

SUMMARY

An aspect of the technology provides a drive assist apparatus, for vehicle, that includes a position detector, a storage, a display, an operation unit, and a controller. The position detector is configured to acquire own vehicle position information on the basis of a position signal received from positioning satellites. The own vehicle position information is information regarding a position of an own vehicle. The storage stores road map information. The display is configured to display a symbol representing the own vehicle at a position indicated by the own vehicle position information acquired by the position detector, and display the road map information around the own vehicle information acquired by the position detector. The operation unit is configured to receive a relative moving operation. The relative moving operation allows the symbol representing the own vehicle and the road map information both displayed on the display to move relative to each other in a vehicle width direction. The vehicle width direction is a width direction of the own vehicle. The controller is configured to correct the own vehicle position information in accordance with the relative moving operation received by the operation unit.

Figure 6A:
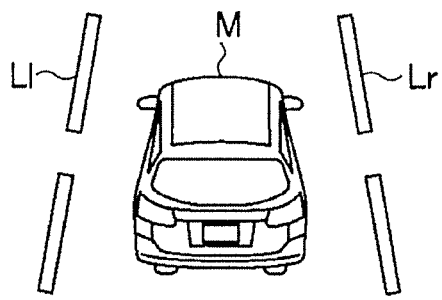
FIG. 6A is a diagram describing an example of a state where the own vehicle is actually traveling in the middle of the lane.
Figure 6B:
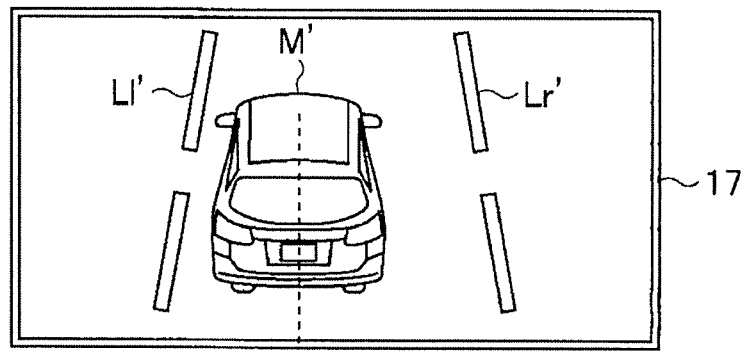
Figure 6B:
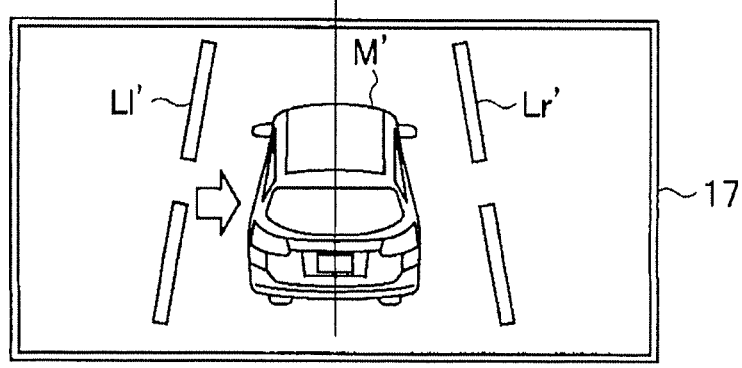

Part (a) of FIG. 6B is a diagram describing an example of an image, displayed on the monitor, including lane lines and the own vehicle before adjusting a traveling line, and Part (b) of FIG. 6B is a diagram describing an example of an image including the lane lines and the own vehicle after adjusting the traveling line.

Figure 7A:
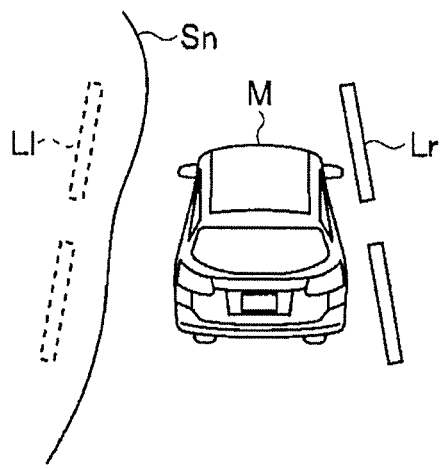

FIG. 7A is a diagram describing an example of an actual position of the own vehicle that is actually traveling.

Figure 7B:
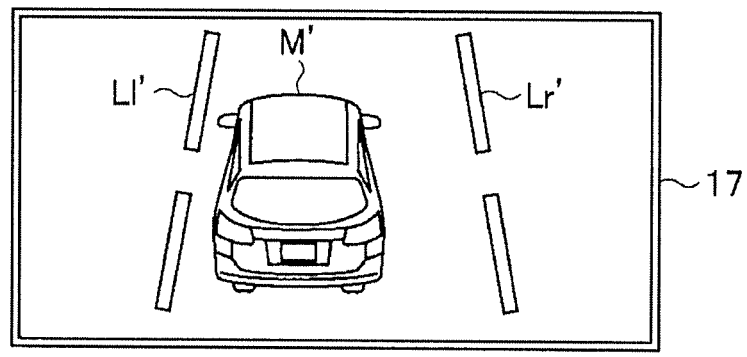

FIG. 7B is a diagram describing an example of an image, displayed on the monitor, in which the lane lines are provided as a reference before adjusting the traveling line.

Figure 7C:
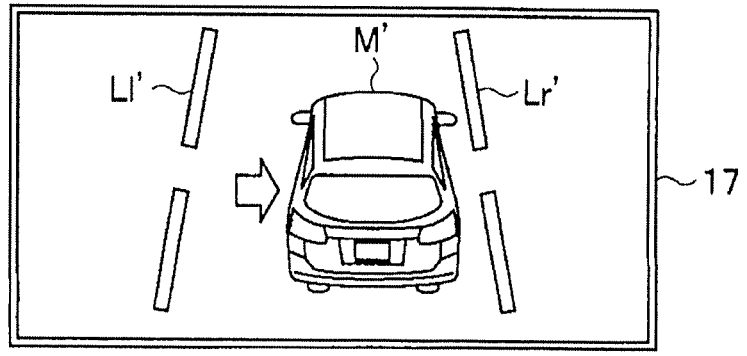

FIG. 7C is a diagram describing an example of an image, displayed on the monitor, after adjusting the traveling line by laterally moving the position of a symbol representing the own vehicle.

Figure 8A:
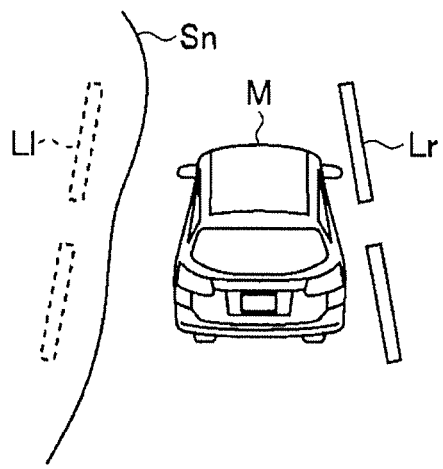

FIG. 8A is a diagram describing another example of the actual position of the own vehicle that is actually traveling.

Figure 8B:
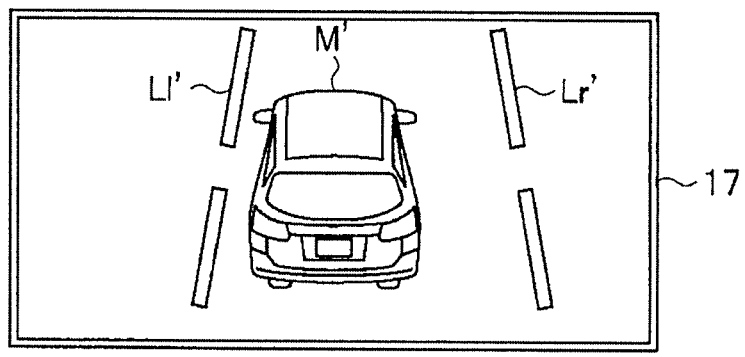

FIG. 8B is a diagram describing another example of the image, displayed on the monitor, in which the lane lines are provided as the reference before adjusting the traveling line.

Figure 8C:
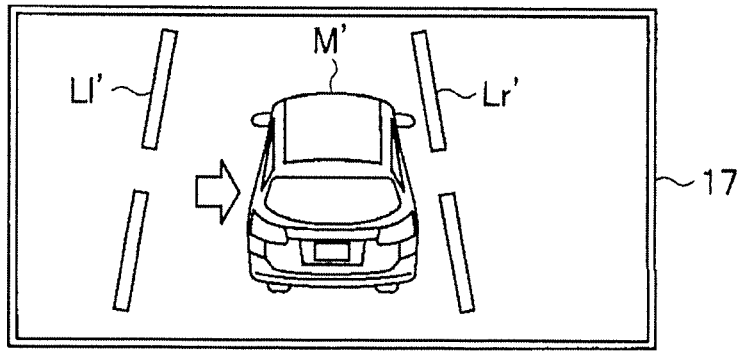

FIG. 8C is a diagram describing another example of the image, displayed on the monitor, after adjusting the traveling line by laterally moving the position of the lane lines.

Figure 9:
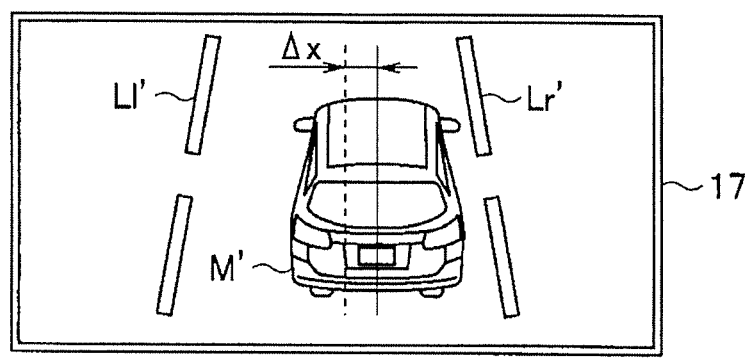

FIG. 9 is a diagram describing an example of an image, displayed on the monitor, after setting the traveling lane.

DETAILED DESCRIPTION

In the following, some implementations of the technology are described with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Position information acquired on the basis of a position signal received from positioning satellites involves a positioning error. Therefore, it may be necessary to so correct the positioning error by initial setting that an own vehicle travels in the middle of a traveling lane, for example. Upon correcting the positioning error, when a camera is mounted on the own vehicle, it is possible to recognize lane lines that define left and right edges of the traveling lane by the camera mounted on the own vehicle and thereby so correct the positioning error that the own vehicle travels in the middle of the recognized lane lines.

It may be difficult, however, to correct the positioning error in a case where the camera is not mounted on the own vehicle. It may be also difficult to correct the position error even when the camera is mounted on the own vehicle, for example, in a case where any of the left and right lane lines are covered with snow and therefore unrecognizable, or in a case where any of the left and right lane lines are faded and therefore unrecognizable.

To address such situations, for example, the following first method may be used. In the first method, first, when a steering override is performed by a driver under a traveling control such as a lane keeping control or a steering control during automatic driving, it is estimated that the own vehicle is traveling in a region closer to one of the lane lines and the driver is therefore operating a steering wheel to cause the own vehicle to travel in the middle of the lane. Further, in the first method, a lateral position of the own vehicle at the time when the steering override ends is set as a feature point, i.e., a point of origin of lateral position, of the own vehicle and the steering control is continued from a position of the set feature point.

However, in the above-described first method, it is difficult for the driver to recognize the presence of the positioning error, for example, until the own vehicle is kept offset from the middle of the lane in a lateral direction while the traveling control is performed. Therefore, the above-described first method involves an issue that it is difficult to recognize the positioning error and correct a target traveling course in advance.

Moreover, according to the above-described first method, the lane keeping control that causes the own vehicle to travel in the middle of the traveling lane may give the driver an uncomfortable feeling who prefers a traveling line that is offset toward one of the lane lines of the traveling lane. To address this, the following second method may be used that makes it possible to set, as the target traveling course, the traveling line preferred by the driver upon traveling under the lane keeping control.

However, it is also difficult in the second method for the driver to set, as the target traveling course, a traveling line in accordance with the driver's preference unless the driver recognizes the situation that the own vehicle is traveling along the preset target traveling course under the lane keeping control. Therefore, it is difficult for the driver to appropriately set the target traveling course before the lane keeping control is started. Hence, the second method involves an issue such as low user-friendliness.

It is desirable to provide a highly-user-friendly drive assist apparatus, for vehicle, that allows easier visual comprehension of any of correction of a positioning error and a change of a traveling line to be set as a target traveling course.

Figure 1:
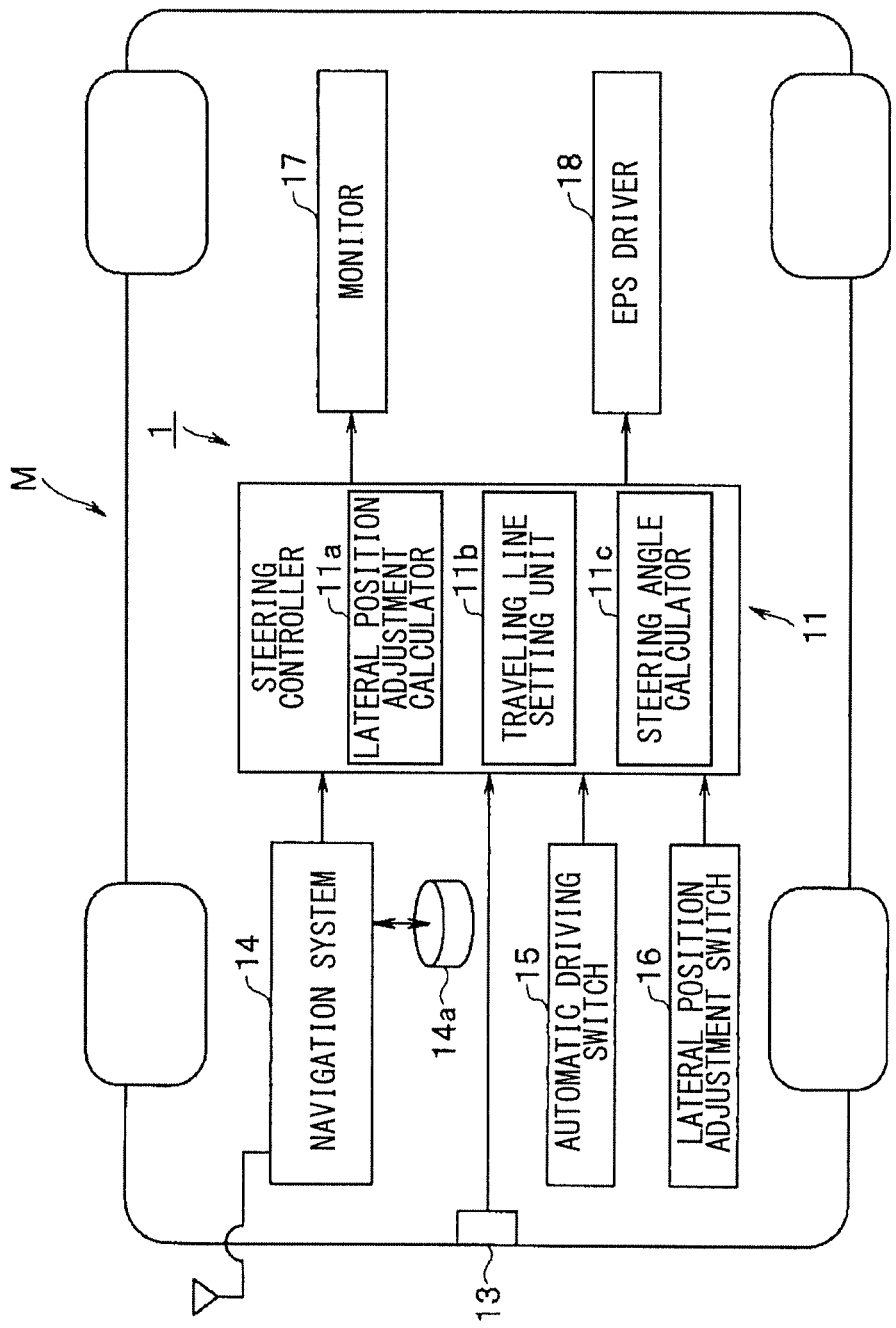
FIG. 1 is a diagram illustrating an example of an overall configuration of a vehicle mounted with a drive assist apparatus of an implementation of the technology.

FIG. 1 illustrates a drive assist apparatus 1 mounted on an own vehicle M. The drive assist apparatus 1 may include a steering controller 11 that performs a steering control during automatic driving. The steering controller 11 may mainly include a known microcomputer including a central processing unit (CPU), a read-only memory (ROM), and a random-access memory (RAM). The ROM may store a control program directed to automatic driving to be executed by the CPU, fixed data, or any other data related to the steering control during the automatic driving, for example.

An input of the steering controller 11 may be coupled to a device that acquires a parameter necessary for the steering control. The device that acquires the parameter necessary for the steering control may include a camera unit 13, a navigation system 14, an automatic driving switch 15 directed to turning on and off of the automatic driving, and a lateral position adjusting switch 16. In one implementation, the lateral position adjusting switch 16 may serve as an "operation unit".

The camera unit 13 may include a camera section and an image processing unit (IPU). The camera section of the camera unit 13 may include a device such as a stereo camera that captures an image of a traveling environment ahead of the own vehicle that is traveling. The traveling environment may include, for example, a left lane line Ll and a right lane line Lr of a traveling lane on which the own vehicle travels, as illustrated in FIG. 6A. The IPU may perform a predetermined image process on an image captured by the camera section to obtain information regarding the traveling environment.

The navigation system 14 may include a receiver that receives a position signal from positioning satellites, for example, in a global navigation satellite system (GNSS) such as a global positioning system (GPS), a global navigation satellite system (GLONASS), or a quasi-zenith satellite system (QZSS). Further, the navigation system 14 may be coupled to a highly-precise road map database 14a. The highly-precise road map database 14a may be provided in a high-capacity storage such as a hard disk drive (HDD), and stores highly-precise road map information, e.g., a dynamic map.

On the basis of the position signal that the receiver has received from the positioning satellites, the navigation system 14 may acquire own vehicle position information that is information regarding the position of the own vehicle M. The own vehicle position information may be, for example, coordinates such as latitude or longitude. Further, the navigation system 14 may set, on the road map information stored in the highly-precise road map database 14a, a guiding route to a destination set by a user such as a driver. The navigation system 14 may also set the acquired own vehicle position information, e.g., the coordinates such as the latitude or the longitude, as a current position of the own vehicle M. In one implementation, the navigation system 14 may serve as a "position detector".

The lateral position adjusting switch 16 may allow the driver to correct a difference between a lateral position of a symbol M' representing the own vehicle M displayed at a position indicated by the own vehicle position information and an actual lateral position of the own vehicle M that is actually traveling. The symbol M' will be described later in greater detail. The lateral position adjusting switch 16 may include a leftward switch 16a and a rightward switch 16b. For example, the leftward switch 16a and the rightward switch 16b may be disposed, for example, at a spoke 21a of a steering wheel 21, and disposed on left side and right side of the automatic driving switch 15, respectively. The automatic driving switch 15 may allow an automatic driving start command signal (an ON signal) and an automatic driving end command signal (an OFF signal) to be alternately outputted to the steering controller 11, each time the driver operates the automatic driving switch 15.

Figure 2:
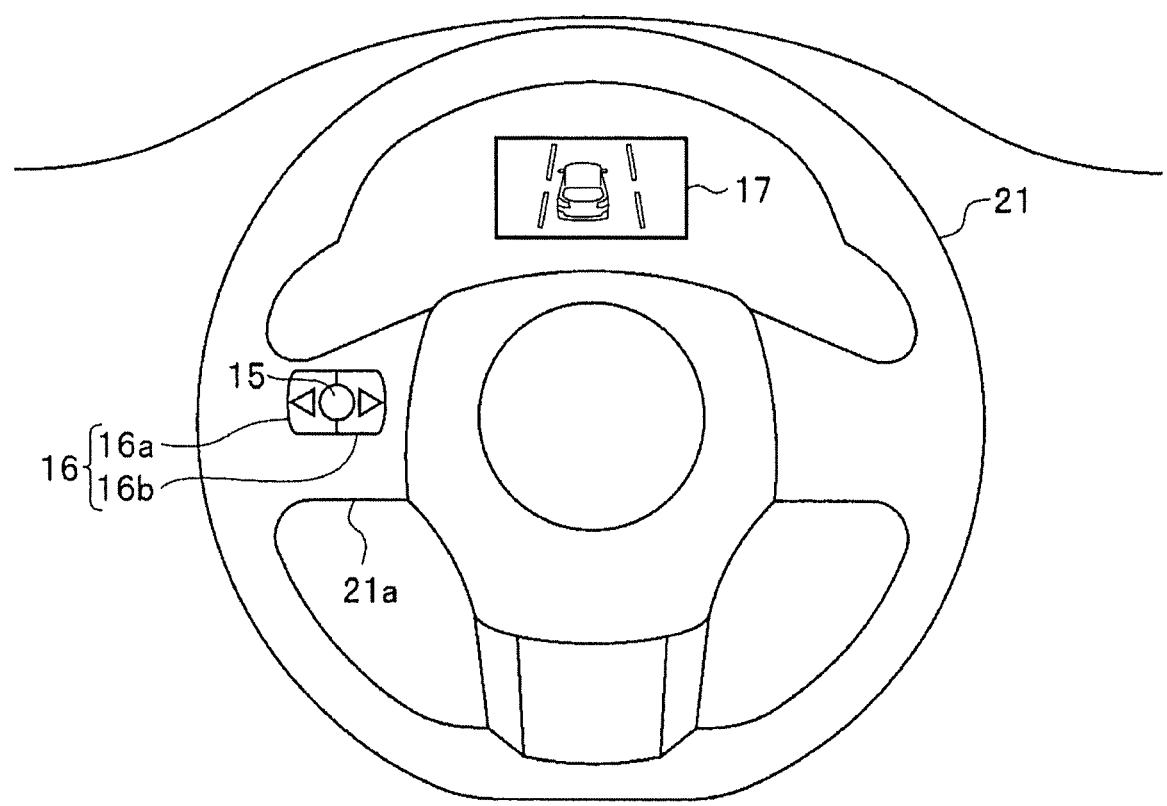
FIG. 2 is a diagram describing an example of a layout of a steering wheel and a monitor that displays a position of an own vehicle in a lane.

An output of the steering controller 11 may be coupled to a monitor 17 and an electric power steering (EPS) driver 18 that drives an EPS. In one implementation, the monitor 17 may serve as a "display". The monitor 17 may be disposed at a position that allows the driver to easily view the monitor 17 easily while the driver is driving the own vehicle M. For example, the monitor 17 may be disposed in a combination meter in front of a driver's seat, as illustrated in FIG. 2. In the example case illustrated in FIG. 2, the driver is able to view the monitor 17 through an opening of the steering wheel 21.

The steering controller 11 may read, from the road map information, lane width data acquired from the current own vehicle position information acquired by the navigation system 14. On the basis of the read lane width data, the steering controller 11 may display, on the monitor 17, symbols Ll', Lr', and M' representing a left lane line Ll, a right lane line Lr, and the own vehicle M, respectively, as illustrated in FIGS. 7B and 9, for example. The left lane line Ll and the right lane line Lr may define the traveling lane, and may each be a white line or a line of any other color. It is to be noted that the alphabetical characters "M", "Ll", and "Lr" in the drawings are provided only for description purpose and are not displayed on the monitor 17.

The own vehicle position information, e.g., the coordinates such as the latitude or the longitude, acquired on the basis of the position signal received from the positioning satellites may involve a positioning error. Therefore, it may be necessary to cause the steering controller 11 to perform lateral position adjustment upon setting of a target steering angle that allows the own vehicle M to automatically travel along a target traveling course set in the middle of the lane. The lateral position adjustment may cause the lateral position of the own vehicle M in the own vehicle position information to be coincident with the middle of the lane. Hereinafter, the wording "be coincident with" and its variant may encompass not only to be precisely coincident with but also to be substantially coincident with.

Upon the lateral position adjustment described above, when the left lane line Ll and the right lane line Lr of the traveling lane are recognizable by the camera unit 13, a difference in a lateral position direction, i.e., a lateral difference, from the middle of the lane to the own vehicle M may be determined on the basis of the left lane line Ll and the right lane line Lr both recognized by the camera unit 13. Further, the target steering angle may be so set that the determined difference in the lateral position direction is decreased, and information regarding drive torque corresponding to the set target steering angle may be supplied to the EPS driver 18. The EPS driver 18 may drive the EPS motor by the drive torque determined by the steering controller 11 to allow steering by the use of the EPS. Thus, the EPS driver 18 may so perform the steering angle control that the own vehicle M travels along the target traveling course.

In this case, as illustrated in FIG. 6A, the own vehicle M is actually traveling in the middle of the lane defined by the left lane line Ll and the right lane line Lr. However, as illustrated in Part (a) of FIG. 6B, the symbol M' representing the own vehicle M displayed on the monitor 17 may be offset toward one of the symbols Ll' and Lr' respectively representing the left lane line Ll and the right lane line Lr, as the display displayed on the monitor 17 is based on the own vehicle position information involving the above-described positioning error. Part (a) of FIG. 6B illustrates an example case where the symbol M' displayed on the monitor 17 is offset toward the symbol Ll'. Further, in a case where any of the left and right lane lines are unrecognizable due to a factor such as a road with snow or bad weather, it may be difficult to correct the positioning error on the basis of the image captured by the camera unit 13. As a result, the own vehicle M may actually travel along the traveling line, illustrated in Part (a) of FIG. 6B, that is based on the own vehicle position information involving the positioning error.

It may be also difficult to cause the own vehicle M to actually travel in the middle of the lane in other cases. For example, in a case illustrated in FIG. 7A where a snow layer Sn resulting from accumulated snow or any other reason extends over the left lane line Ll to inner side of the traveling lane, the driver may cause the own vehicle M to travel in a region closer to the right lane line Lr to avoid the snow layer Sn. Also in such a case, as illustrated in FIG. 7B, the lateral position of the symbol M' representing the own vehicle M displayed on the monitor 17 may be different from the actual lateral position of the own vehicle M that is actually traveling, due to the above-describing positioning error.

In another case, as illustrated in FIG. 9, some drivers may prefer the traveling line that is offset toward one of the left lane line Ll and the right lane line Lr despite that the target traveling course is set in the middle of the lane and the own vehicle M is traveling in the middle of the lane. An example display on the monitor 17 illustrated in FIG. 9 represents a case where the driver prefers a traveling line that is offset toward the right lane line Lr. In such a case, the driver may feel uncomfortable about the own vehicle M automatically traveling in the middle of the lane.

To address such situations, the steering controller 11 may include a lateral position adjustment calculator 11a and a traveling line setting unit 11b that both allow the lateral position of the own vehicle M in the own vehicle position information to match the actual traveling state of the own vehicle M. The lateral position adjustment calculator 11a may perform initial setting of the lateral position of the own vehicle M in the own vehicle position information. The traveling line setting unit 11b may set an offset amount Δx of the traveling line in accordance with the driver's preference from the preset target traveling course. In one implementation, the lateral position adjustment calculator 11a may serve as a "position adjusting unit", and the traveling line setting unit 11b may serve as a "traveling line setting unit". Further, the steering controller 11 may include a steering angle calculator 11c that calculates the steering angle that allows the own vehicle M to travel along the target traveling course.

Figure 3:
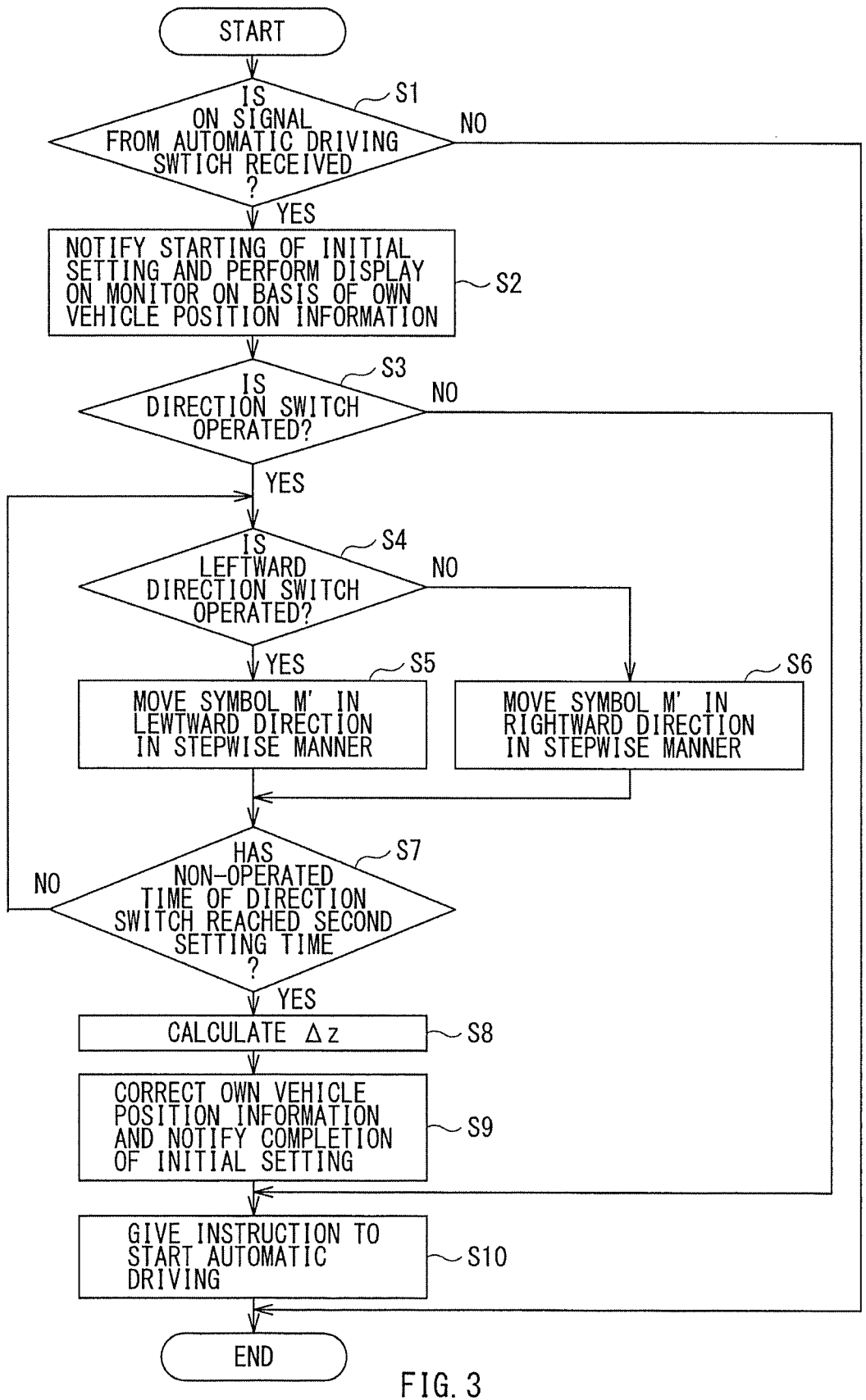
FIG. 3 is a flowchart illustrating an example of an automatic driving initial setting routine.

In one example, the process of initially setting the lateral position of the own vehicle M in the own vehicle position information may be performed by the lateral position adjustment calculator 11a in accordance with an automatic driving initial setting routine illustrated in FIG. 3. The automatic driving initial setting routine may be performed only once when the driver operates the automatic driving switch 15 during driving the own vehicle M to cause the ON signal to be outputted.

Upon performing the automatic driving initial setting routine, in step S1, the lateral position adjustment calculator 11a may first wait for the ON signal from the automatic driving switch 15. When the lateral position adjustment calculator 11a detects the ON signal (step S1: YES), the flow may proceed to step S2. In step S2, the lateral position adjustment calculator 11a may perform notification of starting of initial setting that sets the lateral position of the own vehicle M in the own vehicle position information. Thereafter, also in step S2, the lateral position adjustment calculator 11a may display, on the monitor 17, the symbol M' representing the own vehicle M at the position indicated by the own vehicle position information, e.g. the coordinates such as the latitude or the longitude, acquired by the navigation system 14, and also display the symbols Ll' and Lr' respectively representing the left lane line Ll and the right lane line Lr of the traveling lane corresponding to a region around the position indicated by the own vehicle position information, as illustrated in Part (a) of FIG. 6B. The notification of starting of the initial setting may be performed by means of a sound, a display on the monitor 17, or any other way that allows for the notification.

Thereafter, the flow may proceed to step S3. In step S3, the lateral position adjustment calculator 11a may wait for first setting time until any of the leftward switch 16a and the rightward switch 16b is operated. The first setting time may be, for example, from 5 seconds to 10 seconds. In a case where none of the leftward switch 16a and the rightward switch 16b is operated within the first setting time (step S3: NO), the lateral position adjustment calculator 11a may determine that the actual lateral position of the own vehicle M that is actually traveling is coincident with the lateral position of the own vehicle M in the own vehicle position information. In other words, in the case where none of the leftward switch 16a and the rightward switch 16b is operated within the first setting time (step S3: NO), the lateral position adjustment calculator 11a may determine that the positioning error is minor. Thereafter, the flow may proceed to step S10.

In contrast, when any of the leftward switch 16a and the rightward switch 16b is operated within the first setting time, i.e., when the positioning error is present (step S3: YES), the flow may proceed to step S4. In step S4 and the subsequent steps, the lateral position adjustment calculator 11a may perform adjustment that causes the lateral position of the own vehicle M in the own vehicle position information to be coincident with the actual lateral position of the own vehicle M that is actually traveling.

The driver may determine whether the positioning error is present by comparing the actual lateral position of the own vehicle M that is actually traveling relative to the left lane line Ll and the right lane line Lr with the lateral position of the symbol M' representing the own vehicle M displayed on the monitor 17 relative to the symbols Ll' and Lr' respectively representing the left lane line Ll and the right lane line Lr. In one implementation, the symbols Ll' and Lr' may serve as "road map information corresponding to a region around the own vehicle position information".

First, in step S4, the lateral position adjustment calculator 11a may determine whether the leftward switch 16a is operated. When the driver determines that the lateral position of the symbol M' representing the own vehicle M is offset toward left side compared with the actual lateral position of the own vehicle M that is actually traveling, the driver may operate the rightward switch 16b. In contrast, when the driver determines that the lateral position of the symbol M' of the own vehicle M is offset toward right side compared with the actual lateral position of the own vehicle M that is actually traveling, the driver may operate the leftward switch 16a.

Further, when the lateral position adjustment calculator 11a determines that the leftward switch 16a is operated (step S4: YES), the flow may proceed to step S5. In step S5, the lateral position adjustment calculator 11a may move the lateral position of the symbol M' displayed on the monitor 17 in a leftward direction in a stepwise manner. In contrast, when the lateral position adjustment calculator 11a determines that the rightward switch 16b is operated (step S4: NO), the flow may proceed to branched step S6. In step S6, the lateral position adjustment calculator 11a may move the position of the symbol M' displayed on the monitor 17 in a rightward direction in a stepwise manner.

Thus, the lateral position of the symbol M' displayed on the monitor 17 may be moved to a direction corresponding to the operated one of the leftward switch 16a and the rightward switch 16b. It is to be noted that Part (a) of FIG. 6B illustrates an example state where the lateral position of the symbol M' is offset to the left side. In this case, the driver may operate the rightward switch 16b to thereby cause the lateral position of the symbol M' to move laterally in the rightward direction.

The flow may proceed from step S5 or step S6 to step S7. In step S7, the lateral position adjustment calculator 11a may determine whether non-operated time of the one of the leftward switch 16a and the rightward switch 16b operated in step S4 has reached second setting time. The non-operated time may refer to time during which the one of the leftward switch 16a and the rightward switch 16b that has been operated in step S4 is not operated. The second setting time may be, for example, 1 second. When the non-operated time of the one of the leftward switch 16a and the rightward switch 16b that has been operated in step S4 is less than the second setting time (step S7: NO), the flow may return to step S4 to continue the adjustment of the lateral position. When the driver wants to cause the lateral position of the symbol M' to be accurately coincident with the actual lateral position of the own vehicle M that is actually traveling, the driver may alternately operate the leftward switch 16a and the rightward switch 16b to finely adjust the lateral position of the symbol M'. When the leftward switch 16a and the rightward switch 16b are operated repeatedly within the second setting time, the processes in step S4 to step S7 are preformed repeatedly. Thereby, the lateral position of the symbol M' may be finely adjusted in the leftward direction and the rightward direction.

When the non-operated time of the one of the leftward switch 16a and the rightward switch 16b operated in step S4 reaches the second setting time (step S7: YES), the lateral position adjustment calculator 11a may determine that the initial setting is completed, i.e., determine that the lateral position of the symbol M' is coincident with the actual lateral position of the own vehicle M that is actually traveling as illustrated in Part (b) of FIG. 6B. Thereafter, the flow may proceed to step S8. In step S8, the positioning error Δz illustrated in Parts (a) and (b) of FIG. 6B involved in the own vehicle position information, e.g., the coordinates such as the latitude and the longitude, may be calculated. Thereafter, the flow may proceed to step S9. In step S9, the lateral position adjustment calculator 11a may store the positioning error Δz in the memory in the steering controller 11, and correct the own vehicle position information, e.g., the coordinates such as the latitude or the longitude, on the basis of the positioning error Δz. Thereafter, the lateral position adjustment calculator 11a may perform notification of the completion of the initial setting. Thereafter, the flow may proceed to step S10.

The above-described lateral position adjustment allows for feedforward correction of the positioning error involved in the own vehicle position information acquired on the basis of the position signal received from the positioning satellites. This reduces the correction, of the positioning error, based on the image captured by the camera unit 13. Hence, it is possible to obtain favorable steering controllability. Moreover, the above-described lateral position adjustment allows the driver to perform the lateral position adjustment while checking the lateral position of the symbol M' displayed on the monitor 17. Hence, it is possible for the driver to correct the positioning error more easily while the driver is driving the own vehicle M.

In a case where the snow layer Sn resulting from accumulated snow or any other reason extends over one of the left lane line Ll and the right lane line Lr to the inner side of the traveling lane as illustrated in FIG. 7A, the driver may perform steering toward opposite side from the snow layer Sn to avoid the snow layer Sn. The driver may thereby cause the own vehicle M to travel in a region closer to the other, of the left lane line Ll and the right lane line Lr, which is not covered with the snow layer Sn. It is to be noted that FIG. 7A illustrates an example case where the left lane line Ll is covered with the snow layer Sn, and the driver therefore causes the own vehicle M to travel in a region closer to the right lane line Lr.

When the driver turns on the automatic driving switch 15 in the above-described state, the symbols Ll' and Lr' respectively representing the left lane line Ll and the right lane line Lr may be displayed on the monitor 17, and the symbol M' may be also displayed on the monitor 17 at the position indicated by the own vehicle position information involving the positioning error. Also in this case, it is possible for the driver to cause the lateral position of the symbol M' to be coincident with the actual lateral position of the own vehicle M that is actually traveling by operating any of the leftward switch 16a and the rightward switch 16b, to thereby correct the positioning error. Accordingly, it is possible to perform feedforward correction of the positioning error by the initial adjustment performed by the driver, even in a case where any of the left lane line Ll and the right lane line Lr is unrecognizable by the camera unit 13 and feedback correction of the positioning error is therefore difficult.

Parts (a) and (b) of FIG. 6B, FIG. 7B, and FIG. 7C illustrate an example case where the symbols Ll' and Lr' are fixed on the monitor 17 and the positioning error is adjusted by moving the lateral position of the symbol M' relative to the symbols LP and Lr' in the leftward direction and the rightward direction as described above. Alternatively, as illustrated in FIGS. 8A to 8C, the symbol M' representing the own vehicle M may be fixed in the middle of the monitor 17, and the positioning error may be adjusted by moving the lateral positions of the symbols Ll' and Lr' respectively representing the left lane line Ll and the right lane line Lr in the leftward direction and the rightward direction, i.e., the width direction of the own vehicle M. In this case, the symbol M' representing the own vehicle M is constantly located in the middle of the monitor 17 when the lateral positions of the symbols Ll' and Lr' respectively representing the left lane line Ll and the right lane line Lr are moved. Accordingly, from the driver's point of view, the actual lateral position of the own vehicle M and the lateral position of the symbol M' are viewed as being aligned with each other. Hence, it is possible for the driver to comprehend the traveling situation more easily by the use of the monitor 17.

When the flow proceeds from step S3 or step S9 to step S10, the lateral position adjustment calculator 11a may give instruction to start the automatic driving and end the automatic driving initial setting routine.

As described above, according to an implementation of the technology, when the automatic driving switch 15 is turned on, the symbol M' representing the own vehicle M may be displayed on the monitor 17 at the position indicated by the own vehicle position information, e.g., the coordinates such as the latitude or the longitude, acquired by the navigation system 14, and the symbols Ll' and Lr' respectively representing the left lane line Ll and the right lane line Lr and corresponding to the region around the own vehicle position information may be also displayed on the monitor 17. It is thereby possible to visually and more easily comprehend the positioning error, i.e., the difference between the actual lateral position of the own vehicle M that is actually traveling and the lateral position of the symbol M'. This makes it possible for the driver to adjust the positioning error before starting the automatic driving, by moving the symbol M' representing the own vehicle M relative to the symbols Ll' and Lr' respectively representing the left lane line Ll and the right lane line Lr. Hence, it is possible to minimize an error in the lateral position that is present upon the automatic driving, achieving favorable steering controllability.

Figure 4:
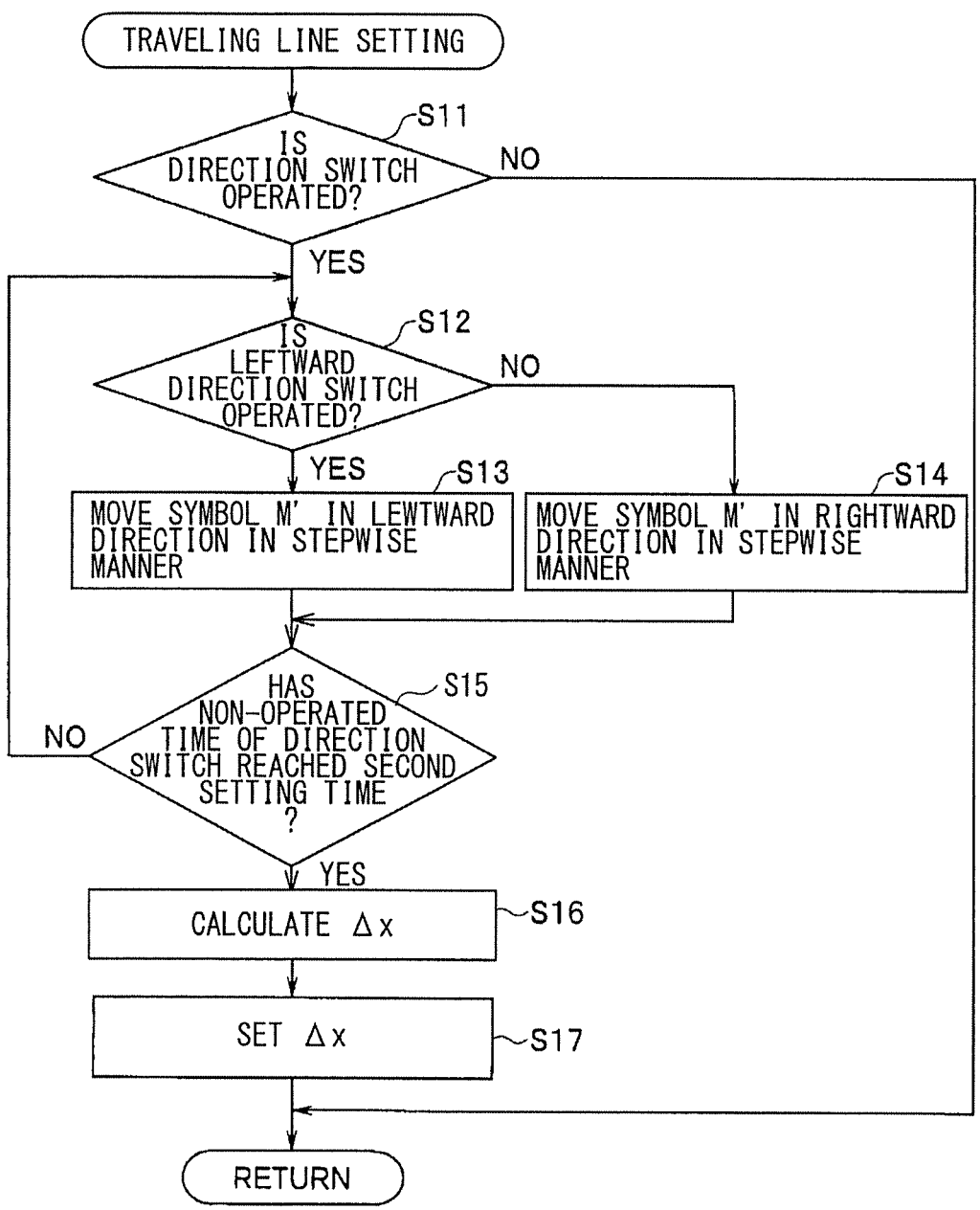
FIG. 4 is a flowchart illustrating an example of a traveling line setting routine.

Moreover, the offset amount Δx of the traveling line in accordance with the driver's preference from the preset target traveling course may be calculated by the traveling line setting unit 11b in accordance with a traveling line setting routine illustrated in FIG. 4. The traveling line setting routine may be launched for each predetermined calculation period after the starting of the automatic driving is instructed in step S10 of the automatic driving initial setting routine described above and illustrated in FIG. 3. In the traveling line setting routine, first, in step S11, the traveling line setting unit 11b may determine whether any of the leftward switch 16a and the rightward switch 16b is operated. When none of the leftward switch 16a and the rightward switch 16b is operated (step S11: NO), the traveling line setting routine may end. In contrast, when any of the leftward switch 16a and the rightward switch 16b is operated (step S11: YES), the flow may proceed to step S12. In step S12, the traveling line setting unit 11b may determine whether the leftward switch 16a is operated.

When the traveling line setting unit 11b determines that the leftward switch 16a is operated (step S12: YES), the flow may proceed to step S13. In step S13, the traveling line setting unit 11b may move the lateral position of the symbol M' representing the own vehicle M displayed on the monitor 17 in the leftward direction in a stepwise manner. In contrast, when the traveling line setting unit 11b determines that the rightward switch 16b is operated (step S12: NO), the flow may proceed to branched step S14. In step S14, the traveling line setting unit 11b may move the lateral position of the symbol M' representing the own vehicle M displayed on the monitor 17 to the rightward direction in a stepwise manner. Thus, the lateral position of the symbol M' displayed on the monitor 17 may be moved to a direction corresponding to the operated one of the leftward switch 16a and the rightward switch 16b. It is to be noted that FIG. 9 illustrates an example state where the lateral position of the symbol M' is moved in the rightward direction in accordance with the operation performed on the rightward switch 16b. In this case, either of the lateral position of the symbol M' and the positions of the symbols Ll' and Lr' may be moved as long as the lateral position of the symbol M' and the lateral positions of the symbols Ll' and Lr' are moved relative to each other. Therefore, the setting may be so made that the symbols LP and Lr' are moved in accordance with the operation performed on the leftward switch 16a and the rightward switch 16b.

Thereafter, the flow may proceed from step S13 or step S14 to step S15. In step S15, the traveling line setting unit 11b may determine whether the non-operated time of the one of the leftward switch 16a and the rightward switch 16b operated in step S12 has reached the second setting time. The second setting time may be, for example, 1 second. When the non-operated time of the one of the leftward switch 16a and the rightward switch 16b that has been operated in step S12 is less than the second setting time (step S15: NO), the flow may return to step S12 to continue the adjustment of the traveling line in accordance with the driver's preference. It is to be noted that it is possible to finely adjust the traveling line in accordance with the driver's preference, by alternately operating the leftward switch 16a and the rightward switch 16b to thereby finely move the lateral position of the symbol M' in the leftward direction and the rightward direction.

When the non-operated time of the one of the leftward switch 16a and the rightward switch 16b operated in step S12 has reached the second setting time (step S15: YES), the traveling line setting unit 11b may determine that the setting of the traveling line in accordance with the driver's presence is completed, and the flow may proceed to step S16. In step S16, the offset amount Δx illustrated in FIG. 9 of the lateral position of the traveling line in accordance with the driver's preference from the lateral position, e.g., coordinates such as latitude or longitude, of the target traveling course preset on the traveling lane, e.g., the middle of the lane width, may be calculated. In step S17, the traveling line setting unit 11b may store or set the calculated offset amount Δx in the memory in the steering controller 11. Thereafter, the traveling line setting routine may end.

Figure 5:
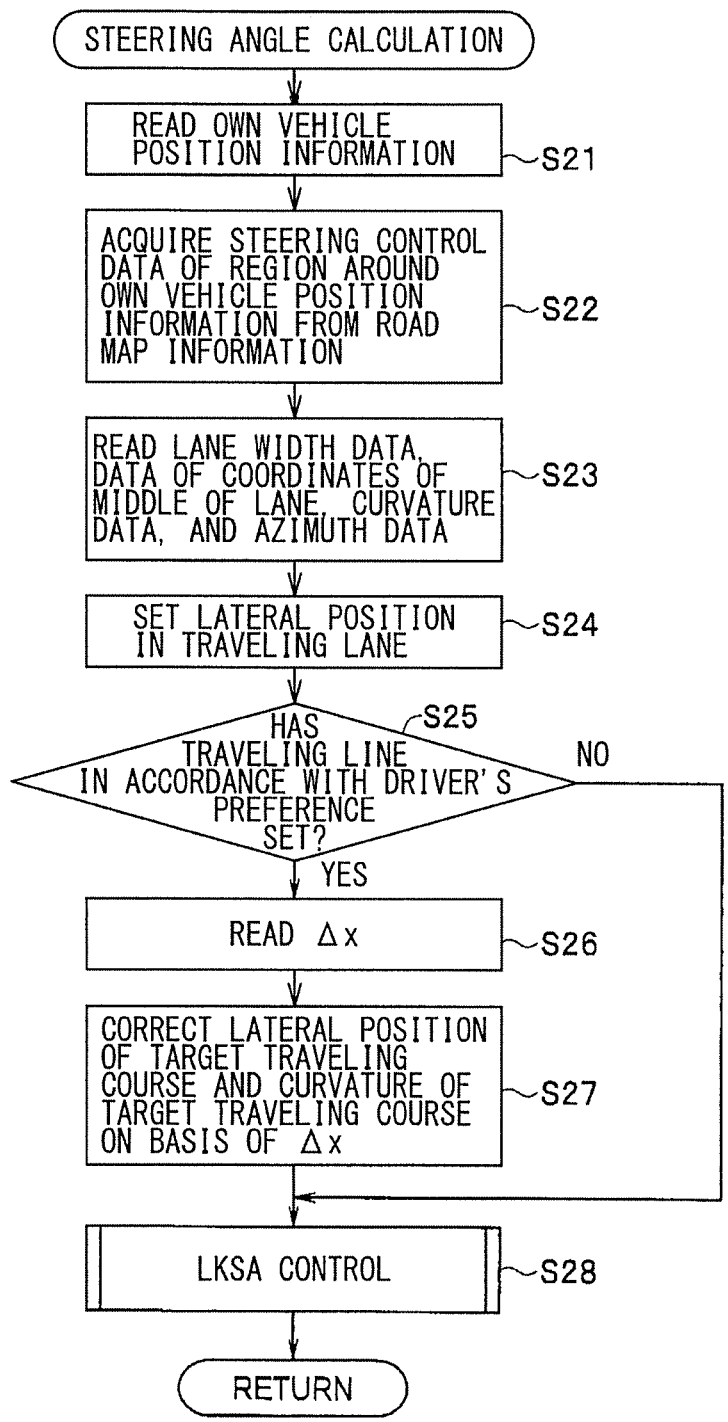
FIG. 5 is a flowchart illustrating an example of a steering angle calculation routine.

Moreover, in one example, a steering angle calculation that allows the own vehicle M to travel along the target traveling course may be performed by the steering angle calculator 11c in accordance with a steering angle calculation routine illustrated in FIG. 5.

In the steering angle calculation routine, first, in step S21, the steering angle calculator 11c may read the own vehicle position information, e.g., the coordinates such as the latitude or the longitude, acquired by the navigation system 14. Thereafter, in step S22, the steering angle calculator 11c may acquire steering control data of a region around the own vehicle position information from the road map information stored in the highly-precise road map database 14a.

Thereafter, the flow may proceed to step S23. In step S23, the steering angle calculator 11c may read road width data, data of coordinates of the middle of the lane width, curvature data, and azimuth data of the traveling lane on which the target traveling course is set from the road map information. Thereafter, in step S24, the steering angle calculator 11c may set the lateral position as the target traveling course on the traveling lane on which the own vehicle M is traveling. In an implementation, the lateral position to be set as the target traveling course may be the middle of the lane line width, and may be set on the basis of a distance from one of the left lane line Ll and the right lane line Lr.

Thereafter, the flow may proceed to step S25. In step S25, the steering angle calculator 11c may determine whether the driver has set the traveling line in accordance with the driver's preference. When the driver has set the traveling line in accordance with the driver's preference (step S25: YES), the flow may proceed to step S26. In contrast, when the driver has not set the traveling line in accordance with the driver's preference, i.e., when the middle of the lane has been set as the target traveling course (step S25: NO), the flow may proceed to step S28.

In step S26, the steering angle calculator 11c may read the offset amount Δx of the traveling line in accordance with the driver's preference from the preset target traveling course. Thereafter, the flow may proceed to step S27. In step S27, the steering angle calculator 11c may correct the lateral position of the target traveling course and the curvature of the target traveling course on the basis of the offset amount Δx illustrated in FIG. 9. Thereafter, the flow may proceed to step S28.

When the flow proceeds from step S25 or step S27 to step S28, the steering angle calculator 11c may perform a lane keeping steering assist (LKSA) control and end the steering angle calculation routine. The LKSA control may allow the own vehicle M to travel along the target traveling course. In the LKSA control, the steering angle calculator 11c may first set, on the basis of one of the left lane line Ll and the right lane line Lr, the target traveling course along which the own vehicle M is to travel. Upon setting the target traveling course, when the traveling line in accordance with the driver's preference is not set, the steering angle calculator 11c may set the target traveling course on the basis of the data of the coordinates of the middle of the lane width, the curvature data, and the azimuth data. In contrast, when the traveling line in accordance with the driver's preference is set, the steering angle calculator 11c may add the offset amount Δx to the data of the coordinates of the middle of the lane width and the curvature data. The steering angle calculator 11c may set the target traveling course on the basis of the data of the coordinates of the middle of the lane width and the curvature data both after the addition of the offset amount Δx and the azimuth data. Further, the steering angle calculator 11c may set the target steering angle that allows the own vehicle M to travel along the target traveling course. Further the steering angle calculator 11c may supply information regarding the steering torque corresponding to the set target steering angle to the EPS driver 18. The steering angle calculator 11c may thereby cause the EPS driver 18 to drive the EPS motor to control the EPS.

As described above, according to an implementation of the technology, the symbols Ll' and Lr' respectively representing the left lane line Ll and the right lane line Lr around the own vehicle position information, e.g., the coordinates such as the latitude or the longitude, acquired by the navigation system 14 may be displayed, and the symbol M' representing the own vehicle M may be also displayed at the position indicated by the own vehicle position information. This makes it possible for the driver to more easily recognize a relationship among the actual lateral positions of the own vehicle that is actually traveling, the left lane line Ll, and the right lane line Lr and the lateral positions of the respective symbols M', Ll', and Lr' displayed on the monitor 17.

As a result, it is possible for the driver to more easily correct the positioning error before starting the automatic driving, by allowing the lateral position of the symbol M' displayed on the monitor 17 to be coincident with the actual lateral position of the own vehicle M that is actually traveling. This improves user-friendliness. Moreover, it is possible to set, as the target traveling course, the traveling line in accordance with the driver's preference immediately before the starting of the automatic driving, by moving the lateral position of the symbol M' displayed on the monitor 17. Hence, it is possible to achieve comfortable automatic driving.

It is to be noted that, according to an implementation of the technology, the positioning error may be corrected in accordance with the operation performed by the driver. Hence, an implementation of the technology is also applicable to a vehicle without a recognizer, such as the camera unit 13, that recognizes the left and right lane lines.

The steering controller 11 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the steering controller 11 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the steering controller 11 illustrated in FIG. 1.

Although the technology has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A drive assist apparatus for vehicle, the drive assist apparatus comprising:
   a position detector configured to receive a position signal from positioning satellites and acquire own vehicle position information of an actual own vehicle based on the position signal received from the positioning satellites;
   a storage that stores road map information;
   a display;
   a controller configured to display, on the display, 1) a traveling lane image representing an actual traveling lane to be traveled by the actual own vehicle according to the road map information and 2) an own vehicle image representing the actual own vehicle according to the own vehicle position information such that the own vehicle image appears within the traveling lane image, wherein the own vehicle image is displayed at a first display position relative to the traveling lane image on the display; and
   an operation unit configured to receive a first input from a driver of the actual own vehicle,
   wherein the controller is configured to:
      move, when the operation unit receives the first input from the driver, a display position of the own vehicle image from the first display position within the traveling lane image to a second display position within the traveling lane image relative to the traveling lane image in a width direction of the own vehicle image on the display;
      determine a distance in the width direction of the own vehicle image between the first display position and the second display position; and
      correct, based on the determined distance, the own vehicle position information to generate a corrected own vehicle position information.

2. The drive assist apparatus for vehicle according to claim 1, wherein the controller is configured to move the display position of the own vehicle image from the first display position to the second display position in the width direction of the own vehicle image on the display based on the first input such that the display relative position between the second image of the own vehicle displayed at the second display position and the second image of the traveling lane coincide with the actual relative position between the own vehicle and the actual traveling lane.

3. The drive assist apparatus for vehicle according to claim 2, wherein the controller is configured to:
   set, based on the corrected own vehicle position information, a traveling line to be set as a target traveling course; and
   cause the actual own vehicle to drive along the target traveling course.

4. The drive assist apparatus for vehicle according to claim 3, further comprising an automatic driving switch that causes the actual own vehicle to start an automatic driving responsive to receiving a second input from the driver,
   wherein the controller corrects the own vehicle position information to generate the corrected own vehicle position information after the automatic driving switch receives the second input from the driver and before the actual own vehicle starts the automatic driving.

5. The drive assist apparatus for vehicle according to claim 2, further comprising an automatic driving switch that causes the actual own vehicle to start an automatic driving responsive to receiving a second input from the driver,
   wherein the controller corrects the own vehicle position information to generate the corrected own vehicle position information after the automatic driving switch receives the second input from the driver and before the actual own vehicle starts the automatic driving.

6. The drive assist apparatus for vehicle according to claim 1, wherein the controller is configured to:
   set, based on the corrected own vehicle position information, a traveling line to be set as a target traveling course; and
   cause the actual own vehicle to drive along the target traveling course.

7. The drive assist apparatus for vehicle according to claim 6, further comprising an automatic driving switch that causes the actual own vehicle to start an automatic driving responsive to receiving a second input from the driver,
   wherein the controller corrects the own vehicle position information to generate the corrected own vehicle position information after the automatic driving switch receives the second input from the driver and before the actual own vehicle starts the automatic driving.

8. The drive assist apparatus for vehicle according to claim 1, further comprising an automatic driving switch that causes the actual own vehicle to start an automatic driving responsive to receiving a second input from the driver,
   wherein the controller corrects the own vehicle position information to generate the corrected own vehicle position information after the automatic driving switch receives the second input from the driver and before the actual own vehicle starts the automatic driving.

9. The drive assist apparatus for vehicle according to claim 1, wherein the operation unit is configured to move the display position of the own vehicle image from the first display position to a second display position relative to the traveling lane image such that a display relative position between the own vehicle image displayed at the second display position and the traveling lane image coincide with an actual relative position between the actual own vehicle and an actual traveling lane.

10. The drive assist apparatus for vehicle according to claim 9, wherein the controller is configured to:
set, based on the corrected own vehicle position information, a traveling line to be set as a target traveling course; and
cause the actual own vehicle to drive along the target traveling course.

11. The drive assist apparatus for vehicle according to claim 9, further comprising an automatic driving switch that causes the actual own vehicle to start an automatic driving responsive to receiving a second input from the driver,
wherein the controller corrects the own vehicle position information to generate the corrected own vehicle position information after the automatic driving switch receives the second input from the driver and before the actual own vehicle starts the automatic driving.

12. The drive assist apparatus for vehicle according to claim 1, wherein the operation unit includes one or more switches configured to switch between an operated state where the first input from a driver of the own vehicle is received and a non-operated state where the first input from the driver of the own vehicle is not received.

13. The drive assist apparatus for vehicle according to claim 12, wherein the one or more switches include a leftward switch that moves the display position of the own vehicle image leftward in the width direction, and a rightward switch that moves the display position of the own vehicle image rightward in the width direction.

14. The drive assist apparatus for vehicle according to claim 12, wherein the controller is configured to:
set, based on the corrected own vehicle position information, a traveling line to be set as a target traveling course; and
cause the actual own vehicle to drive along the target traveling course.

15. The drive assist apparatus for vehicle according to claim 12, further comprising an automatic driving switch that causes the actual own vehicle to start an automatic driving responsive to receiving a second input from the driver,
wherein the controller corrects the own vehicle position information to generate the corrected own vehicle position information after the automatic driving switch receives the second input from the driver and before the actual own vehicle starts the automatic driving.

16. The drive assist apparatus for vehicle according to claim 1, wherein the operation unit includes one or more switches that are disposed at a spoke of a steering wheel of the actual own vehicle.

17. The drive assist apparatus for vehicle according to claim 16, wherein the controller is configured to:
set, based on the corrected own vehicle position information, a traveling line to be set as a target traveling course; and
cause the actual own vehicle to drive along the target traveling course.

18. The drive assist apparatus for vehicle according to claim 16, further comprising an automatic driving switch that causes the actual own vehicle to start an automatic driving responsive to receiving a second input from the driver,
wherein the controller corrects the own vehicle position information to generate the corrected own vehicle position information after the automatic driving switch receives the second input from the driver and before the actual own vehicle starts the automatic driving.

* * * * *